US008886785B2

(12) United States Patent
Apte et al.

(10) Patent No.: US 8,886,785 B2
(45) Date of Patent: Nov. 11, 2014

(54) HOME NETWORK OF CONNECTED CONSUMER DEVICES

(75) Inventors: Raj B. Apte, Palo Alto, CA (US); Erik John Hasenoehrl, Loveland, OH (US); Christopher Paulson, Livermore, CA (US)

(73) Assignee: The Procter & Gamble Company, Cincinnati, OH (US)

(*) Notice: Subject to any disclaimer, the term of this patent is extended or adjusted under 35 U.S.C. 154(b) by 136 days.

(21) Appl. No.: 13/551,558

(22) Filed: Jul. 17, 2012

(65) Prior Publication Data

US 2014/0025798 A1 Jan. 23, 2014

(51) Int. Cl.
*G06F 15/173* (2006.01)

(52) U.S. Cl.
USPC ............................. 709/223; 709/224

(58) Field of Classification Search
USPC ................................ 709/223–224
See application file for complete search history.

(56) References Cited

U.S. PATENT DOCUMENTS

| 7,184,407 | B1 | 2/2007 | Myles et al. | |
|---|---|---|---|---|
| 7,324,824 | B2* | 1/2008 | Smith et al. | 455/456.1 |
| 8,063,750 | B2 | 11/2011 | Knibbe | |
| 2003/0050737 | A1* | 3/2003 | Osann, Jr. | 700/276 |
| 2005/0094610 | A1* | 5/2005 | de Clerq et al. | 370/338 |
| 2007/0283005 | A1* | 12/2007 | Beliles et al. | 709/224 |
| 2008/0069008 | A1 | 3/2008 | Park et al. | |
| 2008/0218334 | A1* | 9/2008 | Pitchers et al. | 340/539.1 |
| 2008/0265799 | A1 | 10/2008 | Sibert | |
| 2008/0303707 | A1* | 12/2008 | Larsen et al. | 341/176 |
| 2010/0082485 | A1 | 4/2010 | Lin et al. | |
| 2011/0059752 | A1 | 3/2011 | Garin et al. | |
| 2011/0068922 | A1 | 3/2011 | Ross | |
| 2011/0251807 | A1 | 10/2011 | Rada et al. | |
| 2011/0299854 | A1 | 12/2011 | Jonsson et al. | |
| 2012/0039310 | A1* | 2/2012 | Dahl et al. | 370/338 |
| 2013/0109406 | A1* | 5/2013 | Meador et al. | 455/456.1 |
| 2014/0022061 | A1 | 1/2014 | Apte et al. | |
| 2014/0022793 | A1 | 1/2014 | Apte et al. | |
| 2014/0022917 | A1 | 1/2014 | Apte et al. | |
| 2014/0022939 | A1 | 1/2014 | Apte et al. | |
| 2014/0022940 | A1 | 1/2014 | Apte et al. | |
| 2014/0022941 | A1 | 1/2014 | Apte et al. | |

(Continued)

FOREIGN PATENT DOCUMENTS

| EP | 2 362 714 A1 | 8/2011 |
|---|---|---|
| WO | WO 2006/095315 A1 | 9/2006 |
| WO | WO 2006/095316 A1 | 9/2006 |
| WO | WO 2008/119158 A1 | 10/2008 |

OTHER PUBLICATIONS

International Search Report; International Application No. PCT/US2013/050822; date of mailing Dec. 17, 2013; 21 pages.

(Continued)

*Primary Examiner* — Krisna Lim
(74) *Attorney, Agent, or Firm* — David M. Weirich; John T. Dipre

(57) ABSTRACT

A method of associating a function to a room within a home, includes forming a mesh network in the structure with a plurality of nodes, each node having a communication module, segmenting the nodes into rooms based upon the time of flight, obtaining an identity for at least one node in a room; and using the identity to assign a function to the room.

7 Claims, 4 Drawing Sheets

(56) References Cited

U.S. PATENT DOCUMENTS

| | | |
|---|---|---|
| 2014/0022968 A1 | 1/2014 | Apte et al. |
| 2014/0023060 A1 | 1/2014 | Apte et al. |
| 2014/0023363 A1 | 1/2014 | Apte et al. |
| 2014/0025798 A1 | 1/2014 | Apte et al. |
| 2014/0025805 A1 | 1/2014 | Apte et al. |

OTHER PUBLICATIONS

International Search Report; International Application No. PCT/US2013/050824; date of mailing Jan. 10, 2014; 17 pages.
International Search Report; International Application No. PCT/US2013/050834; date of mailing Dec. 3, 2013; 18 pages.
Invitation to Pay Additional Fees; International Application No. PCT/US2013/050835; date of mailing Oct. 24, 2013; 6 pages.
International Search Report; International Application No. PCT/US2013/050820; date of mailing Oct. 14, 2013; 11 pages.
International Search Report; International Application No. PCT/US2013/050821; date of mailing Jan. 8, 2014; 17 pages.
International Search Report; International Application No. PCT/US2013/050823; date of mailing Oct. 21, 2013; 11 pages.
International Search Report; International Application No. PCT/US2013/050825; date of mailing Oct. 21, 2013; 11 pages.
International Search Report; International Application No. PCT/US2013/050837; date of mailing Jan. 2, 2014; 17 pages.
International Search Report; International Application No. PCT/US2013/050839; date of mailing Jan. 8, 2014; 16 pages.
International Search Report; International Application No. PCT/US2013/050826; date of mailing Dec. 3, 2013; 17 pages.

\* cited by examiner

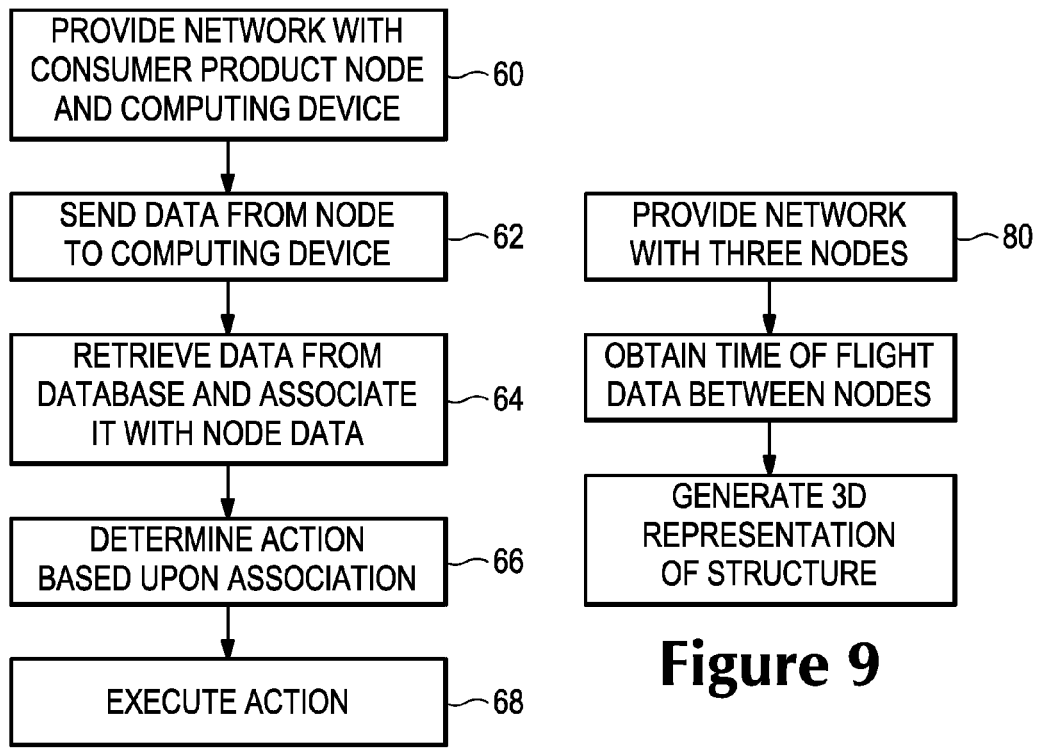

HOME NETWORK OF CONNECTED CONSUMER DEVICES

CROSS REFERENCE TO RELATED APPLICATIONS

U.S. patent application Ser. No. 13/551,539, "Home Network of Connected Consumer Devices," filed Jul. 17, 2012.
U.S. patent application Ser. No. 13/551,546, "Home Network of Connected Consumer Devices," filed Jul. 17, 2012.
U.S. patent application Ser. No. 13/551,551, "Home Network of Connected Consumer Devices," filed Jul. 17, 2012.
U.S. patent application Ser. No. 13/551,562, "Home Network of Connected Consumer Devices," filed Jul. 17, 2012.
U.S. patent application Ser. No. 13/551,563, "Home Network of Connected Consumer Devices," filed Jul. 17, 2012.

BACKGROUND

Low-power, personal area networks such as ZigBee, Z-Wave, Insteon, JenNet-IP, X10 or similar are becoming increasingly prevalent. Appliances, lighting, heating and cooling, security and monitoring systems, entertainment systems, communications, lawn sprinklers, etc., now include control microprocessors and wireless communication devices to allow for wireless connection to the home network. This allows control of these devices to reside in smartphones, PDAs, laptop computers, desktop computers or other devices on which a user-friendly software control interface exists, or control may reside in a network cloud, with the only the interface being local.

Several different ways exist to organize and configure these networks. Existing technologies can associate the home devices into groups based on the ability to communicate using visible light, ultrasound, infrared light, radio frequency and other communications technologies, enabling the devices to be organized into clusters based on the confined space in which they reside, as well as the kind of devices they represent. Integrating a microprocessor into the individual devices allows the devices to receive programming that enables a high degree of flexibility for the user. However, the large number of available configurations can overwhelm the typical user.

Most of the network technologies used here are relatively complicated and difficult for the consumer to use. Adding, authenticating and configuring new devices and types may involve hiring a trained technician to carry out the installation. As the costs of microprocessor, memory, displays, radio transmitters and receivers and line of sight communications decrease, the cost of adding these capabilities to inexpensive and even disposable consumer products becomes possible. This will lead to a new set of challenges for the consumers and the networks.

BRIEF DESCRIPTION OF THE DRAWINGS

FIG. 8 shows a flowchart of an embodiment of a method of determining and executing an action based upon a configuration of an ad hoc, wireless network.
FIG. 9 shows a flowchart of an embodiment of a method of developing a three-dimensional representation of a house.
FIG. 10 shows an example of a three-dimensional representation of nodes in a structure.

DETAILED DESCRIPTION OF THE EMBODIMENTS

General Node and Non-Lighting Device

Figure 1:
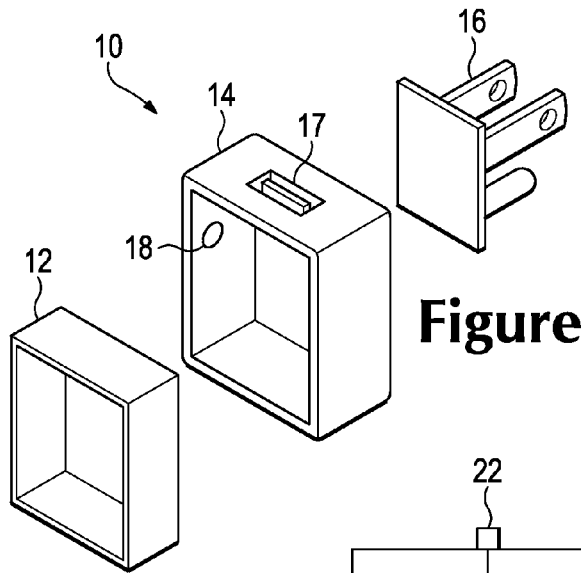
FIG. 1 shows an embodiment of a consumer product device.

FIG. 1 shows an embodiment of a consumer product device having network capability. The device 10 has a receiver or adapter 12 that contains a consumer product. The consumer product may be one of many things. For example, the consumer product may consist of a consumable product dispenser that dispenses or delivers some type of consumable product such as shaving cream, air freshener, toothpaste, lotion, shampoo, cotton swabs, razor blades, tissue, etc. The consumer product may consist of non-powered implements such as a razor, a toothbrush, a hair brush, a duster, a broom, a mop, a scrub brush, a toilet wand, etc. The consumer product may consist of powered devices, such as a coffee maker or other kitchen device like a toaster over, a television, a hair dryer, a vacuum cleaner, air purifier, humidifier, etc. These are only intended as examples of both non-powered and powered products, no limitation to any particular product or configuration is intended nor should any be inferred. Consumer products, as defined here, do not have any networking communication capability. Communication on these devices would only take the form of local communications, such as user interfaces, warning lights, etc.

The receiver 12 would snap onto or allow the consumer device to be otherwise connected mechanically and possibly electrically to the consumer product device 10. For powered devices, the receiver 12 may include a standard 2 or 3 pronged receiver such as seen in power outlets.

The consumer product device also includes at least one communication module or hub 14. The communications hub may comprise one communication module, or several communication modules, each using a different type of communication technologies. For example, the communication module may consist of a room-limited communication module. "Room-limited" means that the communication medium of this device uses signals that generally do not penetrate barriers such as walls, floor and ceilings. Examples include line of sight signals such as optical and acoustic signals. The communication modules may also consist of, or include, a room-transparent communication module. "Room-transparent" means that the communication medium of the device is not limited by walls and floors. These barriers may lessen the signal, but they generally do not stop it. The communication hub 14 may contain one or both of these types of modules, and may contain more than one of each type, such as two room-limited modules and one room-transparent, etc. each with its own capability to connect to other devices in an ad hoc mesh network.

The network capability allows devices that would not otherwise have the ability, to join and leave an ad hoc mesh network and communicate with other devices that may also not otherwise have that ability. Providing these devices and products the ability to communicate and coordinate with other devices allows the user to manage many aspects of his or her household.

The consumer product device may also include a power connector 16 electrically coupled to the communication module. The power connector may take many forms, but will typically consist of a standard 2 or 3 pronged plug. The power connector provides power to the communication module and may also provide power to the consumer product portion of the device.

Other variations and modifications to the consumer product device are possible. For example, a sensor 18 may allow the user to track a level of consumable product within the receiver 12. For example, if the consumer product consists of a dispenser of some sort, the sensor may be a light sensor. The light sensor could be positioned such that light to the sensor is blocked by the consumable product. When the consumable product is used up, light would reach the sensor, indicating that the dispenser is nearly empty. Other types of sensors may include heat sensors, weight sensors, accelerometers, diagnostic sensors, air quality sensors, VOC (volatile organic compounds) sensors, etc. Using the network capability of the device, detection of the state of the consumable product may trigger actions that will be discussed in more detail later.

Figure 2:
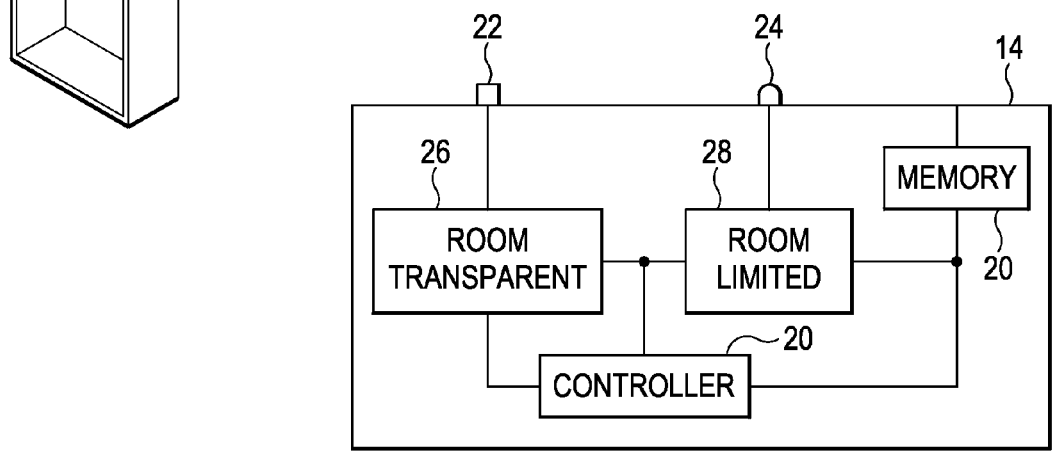
FIG. 2 shows a block diagram of an embodiment of a communications portion of a network device.

FIG. 2 shows an embodiment of the communication module 14 that provides the network capability. The module may contain a room-transparent module 26. The room-transparent module may be a radio, in which case it may have an associated antenna 22. The radio may communicate by way of one of many different types of protocols, but will more than likely use a packet-based protocol such as the Internet Protocol. Even more particularly, the protocol may be one of IP version 6 (IPv6), such as IPv6 over Low Power Wireless Personal Area Networks (6LoWPAN), or the Neighborhood Exchange Protocol.

FIG. 2 shows both a room-transparent and a room-limited communication module, with the understanding that only one is necessary to provide the networking capability. As mentioned previously, the room-limited communication module will generally consist of a light of sight communication module, such as infrared light, visible light, and ultrasound or other acoustic signals, etc. When a receiver is not within sight of the transmitter, the receiver will not receive the signal. The line of sight communication module may have an emitter such as 24 coupled to it.

The communication module 14 will typically receive its power from a power outlet or battery through the power connector 16. However, the power connector 16 may also consist of a wireless power receive. In some instances, a base device may transmit a signal to a receiver that can convert the signal into power for the receiver. Currently, these types of receivers have very limited functionality because of the limited amount of power they receive, and limited range due to losses in the signal carrying the power. However, one can envision solutions to these problems being available in the future and the embodiments here are not limited to direct power connections. Additionally, the device may include both of these types of power connectors. The device may be configured such that the communications modules have extended range when connected to power.

Other optional components are of course possible. For example, the memory 20 may reside within the communication hub, within each communication module, elsewhere in the device, or being a networked or remote memory such as is common in cloud computer. A controller 20 separate from the communication module may also exist, each module may have its own controller, with a central device controller separate from those, or a networked controller.

In addition to sensors configured to sense the state of the consumable products, other types of sensors may exist on the device, or the sensor may reside on its own node. The sensor may be a security sensor, a radio frequency identification tag, a barcode reader, or an environmental sensor, motion sensor, sound sensor, odor sensor, smoke alarms, airborne particulates sensor, pollen and dust sensor, air purification system, metrology, airborne biological agents sensor, bacteria and viruses sensors, surface borne contaminants sensors, sanitary sensors, water quality sensors, moisture sensors, etc. Environmental sensors may sense air quality, light level, temperature and air flow. For example, a sensor sensing the air quality may determine that the room needs freshening and can send a signal through the network to the air freshener to freshen the air. For lighting applications, the sensor could send information about the light level that would cause one or more of lighting devices to turn on. Lighting devices as nodes will be discussed in more detail later.

Returning to FIG. 1, the communications module may also have an optional direct connection communications port, such as a USB or IEEE 1394 (Firewire) port 17. This may provide the user the ability to connect the device to a computing device for initial set up or programming, upgrades of firmware or software, as well as allowing the device to be directly connected to a consumer device having a similar port, such as a television or music system. The port 17 may also allow connection to a network access point or gateway to provide connection to an external network like the Internet.

Lighting Products

Figure 3:
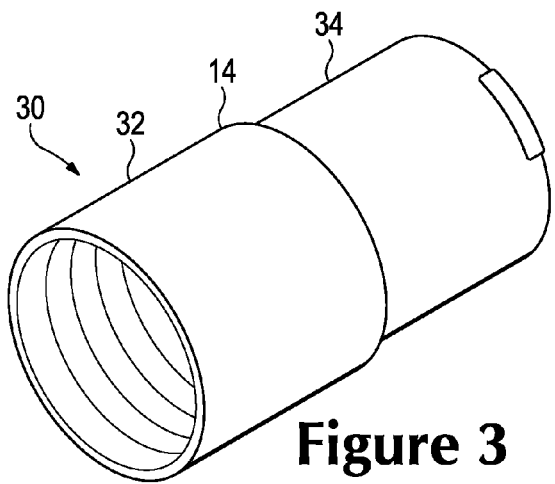
FIG. 3 shows an embodiment of a lighting device.

The discussion to this point has focused on consumer products other than lighting products, including both light bulbs, which are any type of lighting item that screws into a socket to receiver power when switched on and may include traditional incandescent bulbs, LED bulbs, compact fluorescent (CFL) bulbs, etc., and other lighting products such as lamps. And new forms of light that may obtain power through alternative means such as battery, induction, sonic etc. FIG. 3 shows an embodiment of an adapter 30 to be used with a light bulb. The communications module 14 is part of a housing where the housing has a light emitter receptacle 32 configured to accept a light bulb. This allows use of typical household light bulbs, rather than bulbs that have expensive adapters already in them, referred to here as fully integrated light bulbs, or specialized sockets having centrally controllable processors and other adapters. Fully integrated light bulbs with room lists and Ids.

Figure 4:
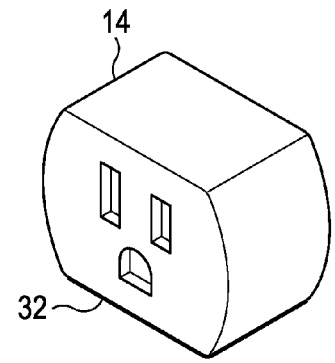
FIG. 4 shows an alternative embodiment of a lighting device.

Alternatively, the light emitter receptacle 32 could take the form of a plug in adapter similar to a power outlet, as shown in FIG. 4. In this embodiment, the back side of the adapter would like similar to the back side of the adapter shown as 16 in FIG. 1. The communication module 14 will have one or both of the room-limited communication module and the room-transparent communication modules discussed in detail above. The light emitter receptacle could accept a light bulb, a light or lamp having a power cord, or a light having an integrated power connector such as that seen in emergency lighting for example.

Similar to the non-lighting adapter discussed above, the lighting device may also include a sensor. The sensor would typically consist of a light sensor, but may also consist of a temperature sensor, a smoke detector, etc. The sensor may communicate with a controller resident in the adapter 30, or it may communicate with a controller located on other lighting devices or non-lighting devices in the ad hoc network. The controller may control the power connection, switching power to the light emitter on or off as dictated by inputs from the sensor, possibly combined with user inputs on lighting levels desired for particular times of day or activities.

The lighting device may form an ad hoc mesh network, in which devices enter and exit the network at will, and all devices in the network may communicate with any and all devices within its range. While there may be a central controller, each device may also have its own controller. Instead of a central controller, one device may designate itself as a master node and provide control signals to the other nodes. In accordance with known ad hoc mesh network protocols, a node may designate itself as a master node, typically based upon its ability to bridge ad hoc mesh network to other networks. In the absence of such a node, the nodes will arbitrate who is the master. The specifics of these processes are not the focus of the discussion.

The discussion to this point has focused on providing consumer products with an ability to form ad hoc, wireless mesh networks. The consumer products may have intelligence ranging from relatively 'dumb' such as light bulbs, sweepers, air fresheners, etc. to high sophistication, such as in consumer electronics and computing devices. Having networks of devices with these capabilities may allow a user to segment the nodes of the network into rooms of the house or structure without any prior knowledge of its floor plan.

Room List/Room ID

Figure 5:
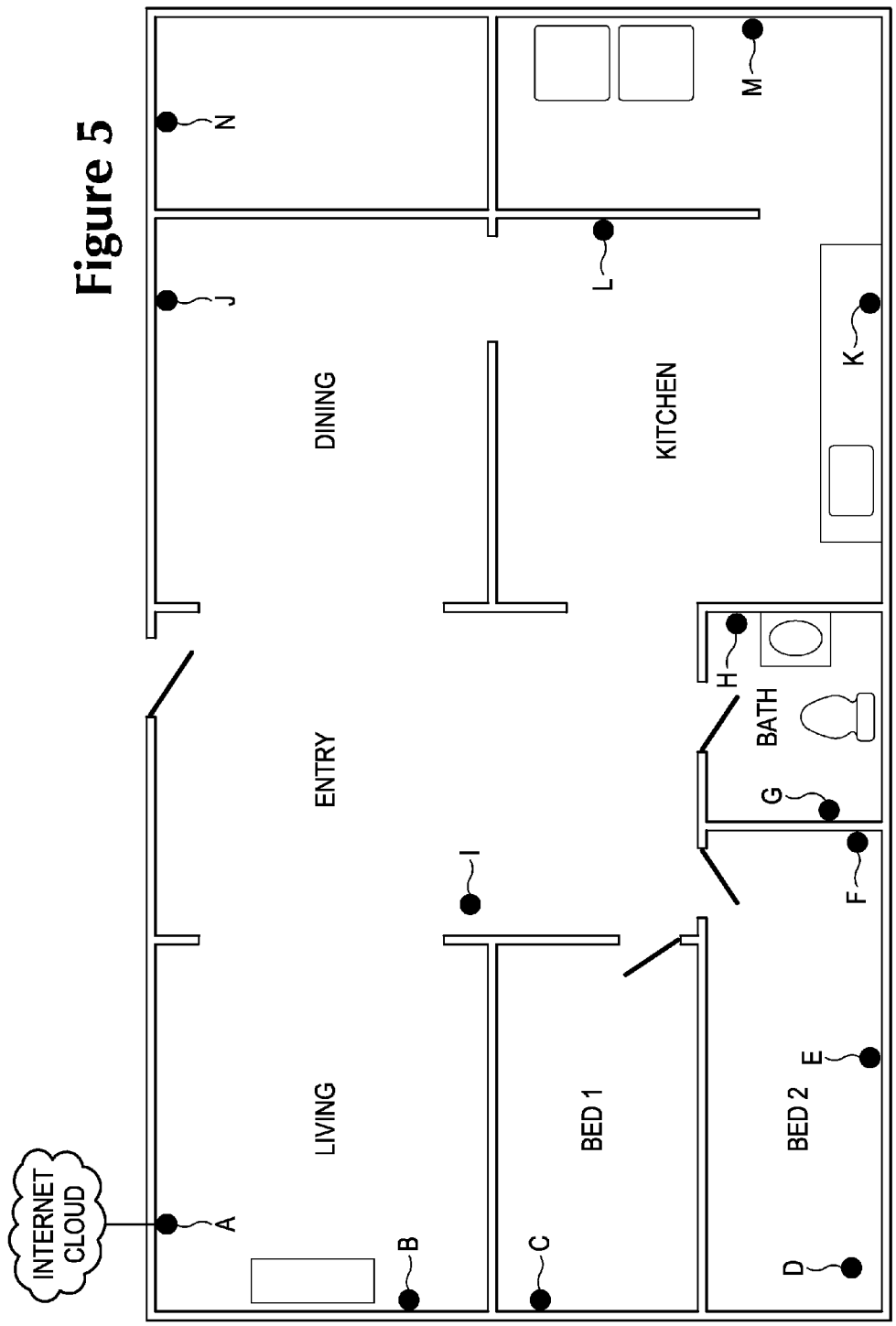
FIG. 5 shows a diagram of an embodiment of a structure having multiple, potential nodes in an ad hoc wireless network.

FIG. 5 shows an example of a floor plan of a house. The techniques employed here may apply to any structure, such as an office building, hospital, that has more than one room. This discussion, focusing on consumer products, will use a house as an exemplary structure. No limitation from this selection was intended or should be implied. The nodes in this network reside in the rooms, but the user does not need or have the floor plan. One should note that the user of the techniques and embodiments is not necessarily a human consumer. The 'user' may be a computing device employed by a human consumer to gather this information so that the human does not need to do so.

Figure 6:
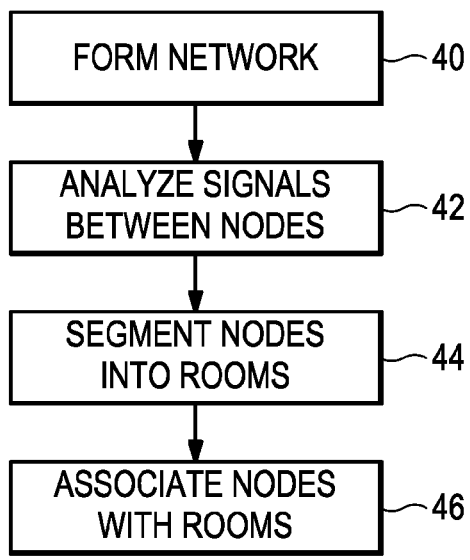
FIG. 6 shows a flowchart of an embodiment of a method of building a room list.

FIG. 6 shows a flowchart of an embodiment of a method of determining which nodes reside in which rooms. At 40, the ad hoc mesh network is formed. This may involve deploying the nodes and then having them broadcast signals notifying any nodes in the area of their presence. The nodes may be lighting products or consumer products such as those previously discussed. As part of forming the network, the nodes may send out their signals and determine the presence of other nodes.

At 42 the signals between nodes are analyzed where the analysis may occur in several locations such as in the network, in the node, in the cloud. Referring to the floor plan of FIG. 5, some nodes will see nodes that other nodes cannot 'see,' where 'seeing' a node means detecting the presence of the node. For example, node I may see nodes J, A, and H. However, node J may also see node L and node K. Node K can see node M. By analyzing the signals, one can determine that node J cannot see node M, so a wall must exist between nodes J and M. Similarly, Node I can see node H through the doorway, but node I cannot see node G, even though node I knows of the existence of node G through information from node H.

Beyond this analysis, the nodes can also determine distances between themselves. A receiving node can determine the time of a transmission from another node and from that determine the distance between nodes, although not necessarily the orientation. Using these two types of analyses, as examples, one can determine rooms within a structure. Relying on the line of sight data, one can segment the nodes into rooms. Even further, relying upon the received signal strength, the network may be able to determine approximate dimensions of the rooms. The nodes have multiple ways of detecting each other, such as optically, electrically, using sensors, etc.

The above analysis assumes only the use of a room-limited communication module. In some embodiments, the nodes may also use a room-transparent communication module. In this instance, the nodes may identify themselves without relying upon room-limited communication. By coupling this data with the line of sign data, the network can identify walls and openings between nodes and segment the nodes into rooms at 44. For example, referring to FIG. 5, node I may be aware of the existence of node C based upon the room-transparent communication module. However, looking at the room-limited signals, node I would not be able to detect the presence of node C, indicating a wall or other barrier lying between them.

Once the nodes are segmented into rooms, the node information is updated to associate that node with that room at 46. One of the nodes on the network may include nonvolatile memory, or the nonvolatile memory may reside external to the network, but in communication with one of the nodes. The room list and nodes associated with the rooms may be stored in this memory. The node upon which the nonvolatile memory or has the link to the nonvolatile memory may be a master node as previously discussed. As these nodes may be attached to or involve consumer products that may either be moved by a user or may themselves be mobile, this process may be repeated periodically to acquire updated information.

One should note that while the above process concentrates on the segmentation of the nodes into rooms, it is possible to also segment the devices into other types of segments, such as segmenting them by user, type of device, etc. This discussion focuses on the segmentation by room, but the use of other types of segments should be considered within the scope of the embodiments presented here.

Room Purpose

Figure 7:
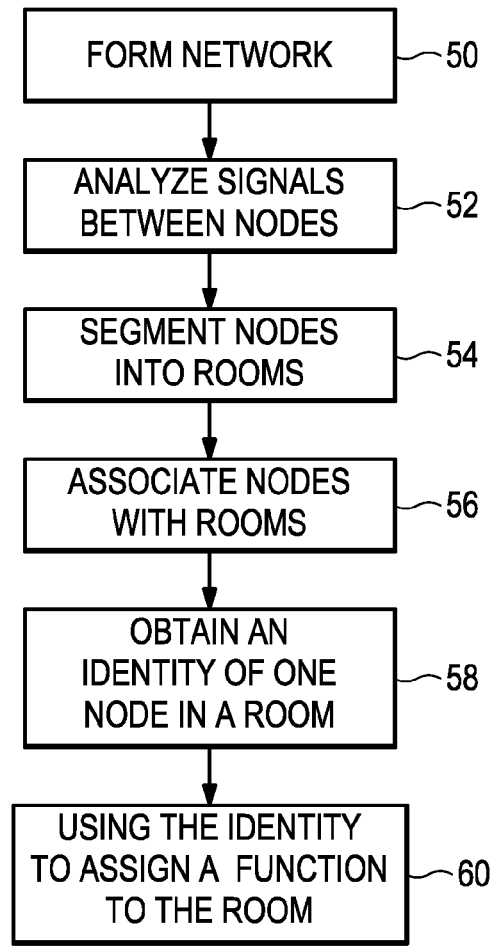
FIG. 7 shows a flowchart of an embodiment of a method of assigning a function to a room.

Once the nodes are segmented into rooms and the nodes associated with those rooms, the network can determine a purpose for each room. FIG. 7 shows a flowchart of an embodiment of a method of assigning a purpose to the room. Processes 50-56 mimic those of FIG. 6 with similar if not the same analysis of the signals to segment the nodes into rooms. The nodes form the network at 50, and the signals between the nodes are analyzed. As mentioned, the analysis may occur at each individual node, at a master node, if one is designated, in the network, in the cloud, etc. Having segmented the nodes into rooms, the network would then obtain the identity of one of the nodes in the room at 58.

Obtaining the identity of one of the nodes in the room may take many forms. The nodes themselves may have information they encode into the signals they transmit, such as a device identifier, a name, etc. The user could install this information into the node when activating the node, using the USB port or a resident interface on the node. The node will have this information in what will be referred to here as 'node data.' The node data includes any information about the node, such as the type of device at the node, the device state such a full or nearly empty, its power status, what other nodes to which it is connected, etc.

In one embodiment, the node data consists at least of an identifier for the device residing at the node. The node or another node on the network accesses a database of identifiers and uses the device identifier as an index into the database. The resulting information provides the network with more information about the node. For example, the device may have as an identifier a stock-keeping unit (SKU) number. Accessing a database results in the SKU being identified as a toothbrush. Other types of identifiers may also exist. The identifier may be a bar code, a network address, a presumed identity based upon an analysis of surrounding devices or information about the environment, etc. Based upon this information, the network may assign a room function to the room at 60, in this example in which the toothbrush resides as a bathroom.

The database may also take many forms. It may be a fully populated product database, or merely a small look up table, and any conceivable option in between those extremes. The database may reside in nonvolatile memory on a node in the network, or it may reside external to the network but accessibly through a link to the external network.

Accessing the database may also occur in layers. A first database may identify a particular device as a toothbrush, triggering access of a second database that provides more information about the toothbrush, such as a model number or brand name. In one embodiment, the database accessed may consist of a database populated by consumers who have similar networks and may have better insight into assigning the function into the room.

The database may be organized in many different ways. In one embodiment, a table of nodes, a table of rooms, and associations between the table of nodes and the table of rooms. In another, a table of nodes in the wireless network, a table of rooms in the house, a list of room functions, and associations between the room functions, the rooms, and the nodes.

In one embodiment, information contained in the room list may prove useful in assigning a function to the room. If the room list were stored using the identity to assign a function to the room based could be based on a current room list. Alternatively, the room function could be assigned based upon a historical or previous room list, a current node function list, a historical node function list, current node location data, historical node location data, current sensor data, historical sensor data, user preference data, an external database of room functions, blueprints of the home, and external data related to the home.

Actions

Having identified a purpose for the room, the network may have the capability to take action based upon the room purpose and the nodes in the room. An embodiment of this process is shown in FIG. 8. In one embodiment, at 62 the network has a node associated with a consumer product, such as an air freshener dispenser, with the understanding that the node may be associated with any type of consumer product device as discussed with regard to FIG. 1. In addition, the network has a node with a computing device such as node A, having a link to either an internal or external network.

At 62, the consumer product node sends data to the computing device node. This data is node data, discussed above, and may include an identifier of the node, a state of the consumer product, power status, etc. The computing device would then access a database at 64 to gather more data about the node and associate that data with the node data. The computing device can then make a determination of an action to be taken with regard to the device at the node at 66 and execute that action at 68. The action may be internal or external to the network.

Internal actions may involve altering the function of then node, such as shutting it down, slowing it down, reducing its usage, etc. It may involve partner devices to the current node having their operation altered, such as activating another device if one is running out of supplies. It may also involve updating an internal database, such as a shopping list to be provided to a user identifying supplies needed at a particular node, or sending a message to the user within the network.

External actions may involve sending a text message to a user through a link to a cell phone network, sending an email through an Internet gateway and mail client, accessing an e-commerce gateway to order more supplies, or accessing information about the devices residing at a node from an external database.

For example, assume the node has an air freshener dispenser. The node data includes an identifier identifying the device as an air freshener and a status indicating an amount of freshener remaining in the reservoir. The node transmits this data to the computing device. The computing device accesses a database, either internal or external, and determines that based upon that amount, the reservoir is nearly empty. The database in this instance may merely be a list stored in a memory. The computing device then identifies different actions based upon the reservoir being nearly empty. The device could contact the user to notify the user of the status. The device could access an e-commerce gateway and order more air freshener. The device could also shut the air freshener down to avoid burning the air freshener device out.

The selection of the action to execute may involve inputs from sensors, user inputs, previous conditions set by the user, etc. For example, a sensor may detect that an air flow through an air filter has dropped below a particular threshold, indicating that the filter needs to be cleaned or changed. This information would assist in the network selecting the action to take.

In this manner, the network gains valuable knowledge about the devices at the nodes of the network, allowing the network to provide services to the user automatically. The more tasks and services the network can handle, the easier it makes the use of the products and the network for the user. Other benefits may also arise from having such a network existing in a structure.

Home Discovery

Mentioned above with regard to the layout of the structure, the user may not have blueprints or floor plans available to input to the network. However, the nodes of the network may 'see' the structure differently. One benefit of the network may lie in its ability to develop a three-dimensional representation of the structure.

FIG. 9 shows one embodiment of a method of performing 'home discovery' in which the network of devices generates a three-dimensional representation of the house. At 80, the network is provided that has at least three nodes. The use of three nodes allows the one node to triangulate its position relative to the other two nodes. Generally, the communication modules in these nodes will be the room-transparent modules. Having three nodes provides enough information for the signal analysis and as one of the nodes may reside on a different floor, the room-limited modules would not allow another node to see that node.

Using time of flight of the signals between the three nodes, as shown in FIG. 10, the signal analysis can produce a general layout of the nodes within a structure. In addition to the signal analysis, other information may also exist. The type of node and whether the node is mobile may also be helpful.

For example, one of the nodes may attach to a floor sweeper, such as a Swiffer® dust mop. The movement of the floor sweeper when being used provides information as to where the non-carpeted floors exist, as well as providing more triangulation data as to the location of the other two nodes. In another example, the node may be attached to a robotic vacuum, such as a Roomba®. This would allow identification of the carpeted surfaces, as well as possible information about locations of furniture in rooms. Other mobile nodes are of course possible. The user could even use a duster or other type of 'wand' structure and map out the structure for the network. Yet another alternative would involve attaching a node to a pet.

More information results in a more accurate picture of the house. While the above discussion focuses on the use of the room-transparent communication module as a means of locating the nodes. However, the above discussions also include the possibility of using the room-limited modules, as well as room segmentation and room purposes that have previously been identified. All of this information may be used to generate a three-dimensional representation of the house, as well as the signal analysis. This information would be stored within the network or external to it, but accessible by at least one node.

The above embodiments provide a convenient, simple and easy to use way for a user to establish a network of nodes of consumer products in a home. The network gathers information for the user, or may act more autonomously. The end result is a network of devices that will assist the user in maintaining and enjoying his or her home.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of associating a function to a room within a home, comprising:
   forming a mesh network in the structure with a plurality of nodes, each node having both a room-transparent communication module and a room-limited communication module;
   determining a time of flight and signal strength for signals between nodes;
   segmenting the nodes into rooms based upon the time of flight and signal strength;
   obtaining an identity for at least one node in a room; and
   using the identity to assign a function to the room based on one or more of a current room list, a historical room list, a current node function list, a historical node function list, current node location data, historical node location data, current sensor data, historical sensor data, user preference data, a external database of room functions, blueprints of the home, and external data related to the home.

2. The method of claim 1, wherein obtaining an identity for at least one node in a room comprises accessing a database of identifiers using an identifier for the at least one node.

3. The method of claim 1, wherein the identity of the at least one node comprises one of a stock keeping unit, a network address, a bar code, and a presumed identity.

4. The method of claim 1, further comprising storing a room list of nodes in a room based upon the segmenting.

5. The method of claim 4, wherein the storing occurs in storage remote from the home on an external network.

6. The method of claim 1, wherein obtaining the identity occurs on an external network.

7. The method of claim 6, wherein obtaining the identity comprises:
   acquiring an identifier for the at least one node;
   accessing a database populated by consumers; and
   using information in the database to determine the function of the room.

* * * * *